United States Patent
Mussler

(10) Patent No.: US 6,827,107 B2
(45) Date of Patent: Dec. 7, 2004

(54) METHOD FOR MANUFACTURING A THROTTLE

(75) Inventor: Michael Mussler, Gaggenan (DE)

(73) Assignee: Aeroquip-Vickers International GmbH, Baden (DE)

(*) Notice: Subject to any disclaimer, the term of this patent is extended or adjusted under 35 U.S.C. 154(b) by 0 days.

(21) Appl. No.: 10/194,008

(22) Filed: Jul. 12, 2002

(65) Prior Publication Data

US 2002/0180109 A1 Dec. 5, 2002

Related U.S. Application Data

(62) Division of application No. 09/211,645, filed on Dec. 15, 1998, now Pat. No. 6,442,838.

(51) Int. Cl.[7] ............................................. F16L 55/04
(52) U.S. Cl. ............................ 138/44; 138/40; 138/177
(58) Field of Search ............................ 138/44, 177, 40, 138/39, 37, 178

(56) References Cited

U.S. PATENT DOCUMENTS

| | | | |
|---|---|---|---|
| 897,309 A | 9/1908 | Sill ............................ 425/392 |
| 1,130,030 A | 3/1915 | Sill ............................ 425/392 |
| 1,803,126 A | * 4/1931 | Oberhuber ............. 15/104.061 |
| 2,016,375 A | 10/1935 | Kipnis ...................... 29/525.01 |
| 3,145,529 A | * 8/1964 | Maloof ....................... 428/569 |
| 3,587,156 A | 6/1971 | Sorenson ............... 29/890.127 |
| 3,739,783 A | * 6/1973 | Broerman ................... 604/349 |
| 3,859,408 A | 1/1975 | Voss et al. ................... 425/302 |
| 4,000,341 A | * 12/1976 | Matson ....................... 428/36.9 |
| 4,118,162 A | 10/1978 | Baumgarten ................ 425/113 |
| 4,126,659 A | 11/1978 | Blad .................... 425/DIG. 14 |
| 4,174,365 A | 11/1979 | Pahl ........................ 425/133.5 |
| 4,424,834 A | * 1/1984 | Sumi et al. .................. 138/121 |
| 4,435,351 A | 3/1984 | Gilmore ..................... 425/437 |
| 4,460,325 A | 7/1984 | Hori et al. .................. 425/393 |
| 4,493,632 A | 1/1985 | Hori et al. .................. 425/393 |
| 4,500,485 A | 2/1985 | Willemsen et al. ......... 425/393 |
| 4,689,864 A | 9/1987 | Fukuma et al. .......... 18/890.12 |
| 4,762,150 A | * 8/1988 | Kokuryu ...................... 138/44 |
| 4,862,571 A | 9/1989 | Prinz et al. .............. 29/890.12 |
| 4,882,101 A | 11/1989 | Ohkita et al. ............... 425/215 |
| 4,926,535 A | 5/1990 | Meadows et al. ........ 29/525.01 |
| 4,987,961 A | * 1/1991 | McNeely, Jr. ............... 175/320 |
| 5,132,073 A | 7/1992 | Nielsen ................... 425/387.1 |
| 5,177,866 A | 1/1993 | Bennett et al. ........ 29/890.127 |
| 5,293,685 A | 3/1994 | Meyer et al. .......... 29/890.127 |
| 5,424,015 A | 6/1995 | Matsuda et al. .............. 425/90 |
| 5,460,205 A | * 10/1995 | Schuh .......................... 138/40 |
| 5,482,086 A | * 1/1996 | Hori et al. ................... 138/103 |
| 5,592,974 A | * 1/1997 | Grohs et al. .................. 138/44 |
| 5,608,963 A | 3/1997 | Lefere ...................... 29/525.01 |
| 5,810,052 A | * 9/1998 | Kozyuk ........................ 138/37 |
| 6,024,129 A | * 2/2000 | Schima ........................ 138/44 |
| 6,119,728 A | * 9/2000 | Seidel-Peschmann et al. ........................... 138/26 |
| 6,131,602 A | * 10/2000 | Oike .......................... 137/177 |
| 6,357,483 B1 | * 3/2002 | Kobayashi ................... 138/40 |
| 6,412,520 B1 | * 7/2002 | Yasumatsu et al. ......... 138/141 |
| 6,442,838 B1 | * 9/2002 | Mussler ................. 29/890.127 |
| 6,478,053 B2 | * 11/2002 | Zanardi ....................... 138/30 |
| 6,505,648 B1 | * 1/2003 | Gergely et al. ............. 137/828 |

FOREIGN PATENT DOCUMENTS

| | | | |
|---|---|---|---|
| DE | 1750643 | 2/1971 | .......... F16L/55/02 |
| DE | 3246821 | 7/1983 | ............. B29H/7/14 |
| EP | 0509344 | 10/1992 | .......... F16L/55/04 |
| GB | 836010 | 6/1960 | |
| JP | 46275 | 3/1983 | |

\* cited by examiner

*Primary Examiner*—Patrick Brinson
(74) *Attorney, Agent, or Firm*—Wood, Herron & Evans, L.L.P.

(57) ABSTRACT

The invention relates to a method for manufacturing a throttle (3) in a hose (1), characterized in that the wall (13) of the hose (1) is manufactured in such a way that the interior of the hose (1) has a constriction in part of its length.

2 Claims, 1 Drawing Sheet

METHOD FOR MANUFACTURING A THROTTLE

This application is a divisional of U.S Application No. 09/211,645 filed Dec. 15,1998, now U.S. Pat. No. 6,442,838.

FIELD OF THE INVENTION

The invention relates to a method for manufacturing a throttle in a hose and a throttle fabricated according to this method, preferably in hydraulic hose systems.

BACKGROUND OF THE INVENTION

In hydraulic hose line systems it is generally known to provide throttles in order to reduce pulsations and disruptive noises. These throttles have hitherto been composed of a plurality of individual components made of steel or aluminum, namely of a tubular throttle with different diameters, which is introduced into the hose, and of a tubular element which is clamped (crimped) onto the hose from the outside in the region of the throttle. A throttle was thus always associated with increased production complexity. The object or the invention is to provide a method for manufacturing a throttle which is of simple design and can be implemented cost-effectively.

SUMMARY OF THE INVENTION

In order to achieve this object, a method is proposed which comprises the steps specified in claim 1. The method is distinguished by the fact that when a throttle is manufactured in a hose the wall of the hose is designed in such a way that the interior of the hose has a constriction in part of its length. The particular feature of the method is that during the manufacture of the throttle it is possible to dispense with the introduction of any installation components into the hose, which simplifies the implementation of the throttle substantially.

One embodiment of the method is distinguished by the fact that the hose is manufactured using a vulcanization method, and that the wall of the hose is designed here in such a way that a constriction is formed. A particular feature of this method is that the constriction is implemented directly during the manufacture of the hose, that is to say therefore it is possible to dispense with additional working steps in order to implement the throttle.

Further refinements result from the other subclaims.

The object of the invention is also to provide a throttle which does not have the abovementioned disadvantages.

In order to achieve this object, a throttle is proposed which exhibits the features specified in claim 8. The throttle is distinguished by the fact that the hose comprises a wall section which is manufactured using a vulcanization method and which is designed in such a way that the interior of the hose has, over part of its length, a constriction which forms a throttle. The manufacture of such a throttle is very economical because it is possible to dispense with the introduction of any installation parts or throttle elements whatsoever into the interior of the hose, and the wall of the hose forms the constriction or throttle directly.

In a preferred exemplary embodiment of the throttle there is provision for a securing clamp to be attached to the hose, which clamp protects said hose against expansion even at a high overpressure. The securing clamp is arranged in the region of the constriction so the throttling properties can be maintained under a very wide variety of operating conditions.

BRIEF DESCRIPTION OF THE DRAWINGS

The invention is explained in more detail below with reference to the drawing, in which.

DETAILED DESCRIPTION

Figure 1:
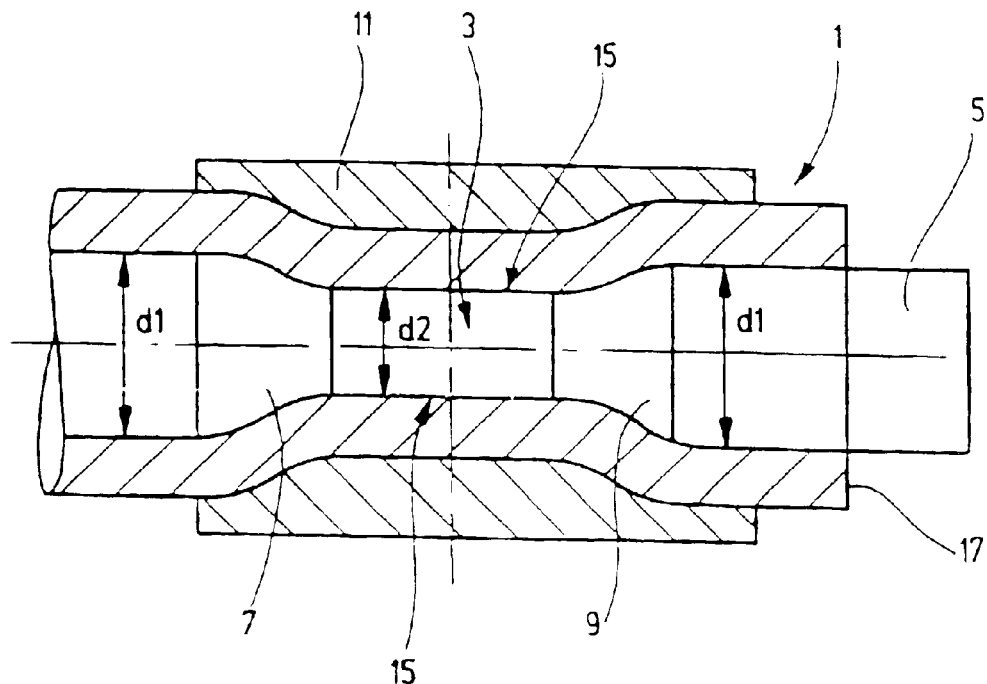
FIG. 1 shows a detail of the blank of a hose with a mandrel introduced and a shaping clamp.

FIG. 1 shows a section of a hose 1 with a throttle 3. The method for manufacturing the throttle 3 is apparent from FIG. 1. This illustration shows the so-called blank of the hose 1, that is to say a hose which still has to be subjected to a vulcanization method. Introduced into the hose 1 is a mandrel 5 which has areas with different external diameters. In the two sections upstream and downstream of the throttle 1, the mandrel has an external diameter d1. For the rest, it is conceivable also to provide different external diameters of the mandrel 5 upstream and downstream of the throttle 3. In the centre of the throttle 3, the mandrel 5 has an external diameter d2 which is significantly smaller than the external diameter d1. Adjoining the area or the mandrel 5, which is located in the centre of the throttle 3, are transition areas 7 and 9 in which the external diameter d1 which occurs outside the throttle 3 changes gradually to the external diameter d2. The contour of the transition areas 7 and 9 can be adapted to the flow conditions in the region of the throttle 1.

FIG. 1 shows that the blank of the hose 1 bears against she external contour of the mandrel 5, therefore that the internal diameter of the hose 1 upstream and downstream of the throttle 3 corresponds to the external diameter d1 of the mandrel, and that the internal diameter of the hose 1 in the centre of the throttle 3 corresponds to the external diameter d2 of the mandrel 5. It becomes clear that, for the rest, the internal contour of the hose 1 corresponds to the external contour of the mandrel 5 in the transition areas 7 and 9.

In order to ensure that the blank of the hose 1 bears against the external contour of the mandrel 5, a shaping clamp 11 is provided in the region of the throttle 3, the internal contour of said clamp corresponding to the desired external contour of the hose 1 in the region of the throttle 3. The internal diameter of the shaping clamp 11 is selected in the example of the throttle 3 illustrated here to be such that the wall 13 of the hose 1 is identical upstream and downstream of the throttle 3 and in the region of this throttle 3.

However, it is possible to design the shaping clamp 11 in such a way that the wall 13 of the hose 1 is reinforced in the region of the throttle 3 and thus has a higher resistance against expansion after the hose 1 has been fabricated.

The method for manufacturing the throttle 3 in the hose 1 will be explained in more detail below with reference to FIG. 1:

A mandrel 5 is introduced into a blank of a hose 1, said mandrel serving to determine the internal contour of said hose. In order to manufacture the throttle 3, the mandrel 5 is provided in the region of the throttle 3 with a constriction 15 which is distinguished by a reduced external diameter d2 of the mandrel 5. In a suitable way it is ensured that the hose 1 bears against the external contour of the mandrel 5. In order to ensure precise shaping of the throttle 3, the shaping clamp 11 can be positioned in the region around the hose 1 in which the mandrel 5 has the construction 15 and in which the throttle 3 is to be implemented. It is readily apparent that the constriction 15 can be provided at virtually any desired point of the blank of the hose 1, and therefore that the position of the throttle 3 is freely selectable within the hose 1. Within the exemplary embodiment illustrated here, the throttle 3 is located near to the one end 17 of the hose 1.

After it has been ensured that the wall 13 of the hose 1 has come to bear against the external contour of the mandrel 5, the blank is subjected to a vulcanization method. Then, the shaping clamp 11 can be removed. The mandrel 5 can subsequently be pulled out of the finished hose 1.

It is clear from the above that the shaping clamp 11 can be manufactured, for example, from metal, but also from any other desired material which retains its shape during the vulcanization process. Correspondingly, the mandrel 5 can be manufactured from materials which are sufficiently temperature-resistant and dimensionally stable to shape the hose 1 in the desired way. The mandrel 5 can be formed here from solid material or as a hollow pipe which points into the external contour illustrated in FIG. 1.

Figure 2:
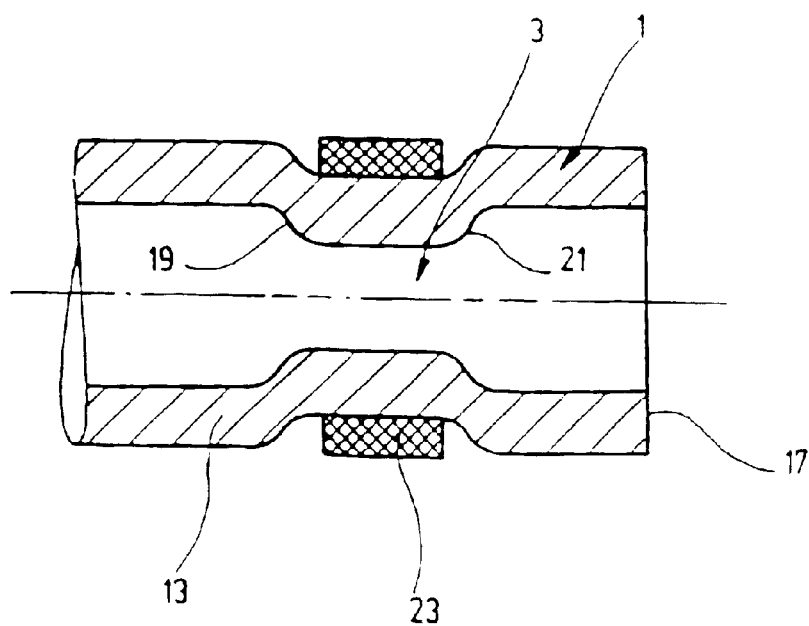
FIG. 2 shows a hose after vulcanization with a securing clamp.

FIG. 2 shows a hose 1 after the vulcanization and after the shaping clamp 11 and the mandrel 5 have been removed. The shape of the hose 1 (illustrated in FIG. 2) differs from that of the hose 1 represented in FIG. 1. This shows that the manufacturing method can be used for different shapes of hoses and throttles.

The hose 1 illustrated in FIG. 2 has in the region of the throttle 3 a preshaped wall 13 which is designed in such a way that the interior of the hose 1 is constricted in the region of the throttle 3. It is apparent that the internal diameter of the hose 1 is greater upstream and downstream of the throttle 3 than in the immediate region of the throttle. FIG. 2 also clearly shown two transition areas 19 and 21 which have been produced as a result of shaping the transition areas 7 and 9 of the mandrel 5. In the exemplary embodiment of the hose 1 illustrated in FIG. 2, there is also provision for its internal diameter to be identical upstream and downstream of the throttle 3, respectively. However, it is readily possible here to provide different internal diameters upstream and downstream of the throttle 3.

During the manufacture of the throttle 3, it is possible, as stated above, to provide for the wall 13 of the hose 1 to have a thickened portion in the region of the throttle 3 or to be protected particularly against an overpressure in some other way. There may be, for example, circumferential chamfers provided here, which protect the hose 1 against expansion. However, it is particularly simple to provide, in the region of the throttle 1, a securing clamp 23 which is laid around the outside of the hose 1 and whose length is selected such that it extends at least over the central region of the throttle 3 and prevents the hose 1 expanding when there is an overpressure in its interior. The length of the securing clamp 23 measured in the axial direction of the hose 1 can be adapted to the pressure conditions in the hose 1. It is therefore conceivable to provide a narrow ring here as securing clamp, or to provide a tubular section which extends essentially over the length of the region of the throttle 3 in which the latter has the smallest internal diameter, and which therefore corresponds to the construction 15 in the mandrel 5 (see FIG. 1).

The material from which the securing clamp 23 is composed is adapted to the pressure conditions prevailing in the hose 1. It is therefore possible to use securing clamps 23 made of steel, aluminium, Tefal or else from plastic. It is finally also conceivable to lay one or more layers of a metal band or textile band around the hose 1 in the region of the throttle 3 and to secure them there.

It becomes readily apparent from the above that the throttle 3 in the hose 1 can be realized easily and thus cost-effectively. In particular, it is possible to dispense with the installation of throttle elements in the interior of the hose 1, and with their fixing by means of holding clamps applied from the outside. Given corresponding pressure conditions or materials of the wall 13 of the hose 1 it is sufficient to preshape the wall 13 in such a way that the throttle 3 is formed. For the rest, it is possible to provide a securing clamp 23 which can easily be applied since the location of the mounting can easily be detected owing to the constriction, which can also be detected from the outside, in the hose 1 in the region of the throttle 3. When throttle elements, which have to be fixed from the outside by means of clamps or the like, are introduced into the interior of the hose 1, the location of the mounting of the clamps is under no circumstances as easy to detect as is the case here.

Finally, the figures clearly show that the shape of the throttle 3 can be adapted to various flow conditions. Also, shoulders are not produced in the interior of the hose 1, as is the case when small throttle pipes or the like are introduced. The throttle 3 which is realized here is therefore distinguished by the fact that additional noises as a result of eddying or the like are not produced.

The throttle 3 which is explained with reference to FIGS. 1 and 2 can be used in any desired hydraulic systems, for example in steering booster systems or ride level control systems. Of course, the throttle 3 can be used not only in the high pressure region of a hydraulic system but also in the low pressure region. Pulsations or vibrations and associated noises can therefore be very effectively damped, the location of the throttle can especially also be adapted in an optimum way to the desired damping properties, or to the generation of pulsations and vibrations or noises.

What is claimed is:

1. Throttle in a hose, comprising a hose having a vulcanized rubber wall section having a substantially uniform inner and outer diameter and is shaped in such a way that the interior of the hose has, over part of its length, a constriction formed in the wall section between extending wall sections having wherein the inner and outer diameter of the constriction is less than the substantially uniform inner and outer diameter of said extending wall sections of the rubber hose, wherein said constriction reduces pulsations and disruptive noises within a fluid line similar unconstricted diameters.

2. Throttle according to claim 1, further comprising a securing clamp which is laid around the hose in the region of the constriction.

* * * * *